(12) United States Patent
Lee

(10) Patent No.: US 8,182,048 B2
(45) Date of Patent: May 22, 2012

(54) VALVE FOR ANTI-LOCK BRAKE SYSTEM

(75) Inventor: Chung Jae Lee, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 782 days.

(21) Appl. No.: 12/053,092

(22) Filed: Mar. 21, 2008

(65) Prior Publication Data

US 2008/0252139 A1    Oct. 16, 2008

(30) Foreign Application Priority Data

Apr. 12, 2007    (KR) ........................ 10-2007-0035837

(51) Int. Cl.
*B60T 8/36* (2006.01)
(52) U.S. Cl. .................................... 303/119.2
(58) Field of Classification Search ............... 303/119.2; 251/129.15
See application file for complete search history.

(56) References Cited

U.S. PATENT DOCUMENTS

| | | | |
|---|---|---|---|
| 6,254,199 B1 * | 7/2001 | Megerle et al. | 303/119.2 |
| 6,382,250 B1 | 5/2002 | Gruschwitz et al. | |
| 6,637,724 B1 * | 10/2003 | Mayer | 251/129.15 |
| 6,644,623 B1 * | 11/2003 | Voss et al. | 251/129.15 |
| 2002/0145125 A1 * | 10/2002 | Tomoda et al. | 251/129.15 |
| 2005/0051749 A1 * | 3/2005 | Lee | 251/129.15 |
| 2006/0081803 A1 * | 4/2006 | Kawa et al. | 251/129.15 |
| 2008/0252140 A1 * | 10/2008 | Lee | 303/119.2 |

FOREIGN PATENT DOCUMENTS

| | | |
|---|---|---|
| DE | 19921875 A1 | 11/2000 |
| DE | 102004038497 A1 | 3/2006 |
| EP | 1647460 A1 | 4/2006 |
| KR | 1020030031612 | 4/2003 |

\* cited by examiner

*Primary Examiner* — Thomas J Williams
(74) *Attorney, Agent, or Firm* — McDermott Will & Emery LLP

(57) ABSTRACT

Disclosed is a valve for an anti-lock brake system, in which a sleeve sheet is assembled with a lower portion of a valve housing, so that the external shape and the structure of the valve are simplified. The valve includes a valve core; an armature positioned below the valve core and provided at an end thereof with a ball; a cylindrical sleeve coupled with outer peripheral surfaces of the valve core and the armature to guide an up/down movement of the armature; a first elastic member installed between the valve core and the armature; a valve housing coupled to one end of the cylindrical sleeve and formed therein with a hollow section that extends lengthwise along the valve housing; a valve seat press-fitted into the hollow section and formed with a first orifice which is open/closed by the ball; and a filter seat press-fitted into the valve housing and provided with an inlet and an outlet, which are positioned at a circumferential portion and a lower portion of the filter seat, respectively.

4 Claims, 3 Drawing Sheets

PRIOR ART

VALVE FOR ANTI-LOCK BRAKE SYSTEM

This application claims the benefit of Korean Patent Application No. 10-2007-0035837 filed on Apr. 12, 2007, in the Korean Intellectual Property Office, the disclosure of which is incorporated herein by reference.

BACKGROUND OF THE INVENTION

1. Field of the Invention

The present invention relates to a valve for an anti-lock brake system. More particularly, the present invention relates to a valve for an anti-lock brake system, in which a sleeve sheet is assembled with a lower portion of a valve housing, so that the external shape and the structure of the valve are simplified.

2. Description of the Related Art

In a hydraulic brake system of a vehicle, hydraulic pressure is applied to a master cylinder according to an operation of a brake pedal, so that braking is achieved. At this time, if braking force is greater than static friction force between a tire and a road, the tire may slip on the road, which is called "slip phenomenon".

However, since a dynamic coefficient of friction is smaller than a static coefficient of friction, the slip phenomenon must be prevented to realize an optimum braking operation. In addition, handle-lock phenomenon that makes it impossible to control a handle during the braking operation must be prevented.

For this reason, there has been suggested an ABS (anti-lock brake system) which prevents the handle-lock phenomenon by controlling hydraulic pressure applied to a master cylinder. The ABS basically includes a plurality of solenoid valves, an ECU for controlling the solenoid valves, an accumulator, and a hydraulic pump.

The solenoid valves are classified into normal-open type solenoid valves, which are installed at an upstream side of a hydraulic brake and normally maintain an open state, and normal-close type solenoid valves, which are installed at a downstream side of the hydraulic brake and normally maintain a closed state.

Referring to FIG. 1, a conventional normal-close type solenoid valve (hereinafter, simply referred to as a solenoid valve) is installed in a modulator block 1 to increase the integration degree. A valve bore 2 is formed in the modulator block 1 through a cutting process such that a valve can be installed in the valve bore 2.

The valve bore 2 is communicated with an internal fluid path formed in the modulator block 1 and a valve housing 3 is inserted into the valve bore 2.

A cylindrical sleeve 5 is coupled to one end of the valve housing 3 such that an armature 4 installed in a hollow section of the valve housing 3 can move up and down through the cylindrical sleeve 5, and a valve core 6 is coupled to an open end of the sleeve 6 to close the open part of the sleeve 6 and to allow the armature 4 to move up and down.

In addition, the armature 4 is provided at an end portion thereof with a plunger 8. The plunger 8 opens/closes an orifice 7a of a valve seat 7 as the armature 4 moves up and down, and extends toward the valve seat 7 installed in the hollow section of the valve housing 3.

A spring 9 is installed between the armature 4 and the valve core 6. The spring 9 elastically supports the armature 4 such that the orifice 7a can be maintained in a closed state by the armature 4 in normal time. An excitation coil (not shown) is provided at an outer portion of the sleeve 5 and the valve core 6 in order to induce electronic interaction to move the armature 4 up and down.

As power is applied to the excitation coil, electromagnetic force is generated between the valve core 6 and the armature 4, and the armature 4 is moved toward the valve core 6 due to the electromagnetic force, thereby opening the orifice 7a of the valve seat 7. In contrast, if the power being applied to the excitation coil is shut off, the electromagnetic force is not applied to the armature 4, so the armature 4 returns to its original position by elastic force of the spring 9. Thus, the orifice 7a is closed.

However, according to the conventional solenoid valve having the above structure, components are installed about the valve housing 3, so the valve housing 3 must be formed with a space for installing the plunger 8, the orifice 7a, the valve seat 7 and a sealing member 10. In addition, the valve housing 3 must be formed with an inlet 3a and an outlet 3b for fluid communication. For this reason, the valve housing 3 may have a complicated configuration, so that the valve housing 3 must be processed through a plasticizing process, such as a forging process, and a precise cutting process. Therefore, the size of the valve housing 3 is enlarged, so that the size of the solenoid valve is also enlarged, causing increase in the manufacturing cost for the solenoid valve.

SUMMARY OF THE INVENTION

Accordingly, it is an aspect of the present invention to provide a valve for an anti-lock brake system, capable of facilitating assembling work and reducing the manufacturing cost thereof by simplifying the fabrication process and assembling process for the valve.

Additional aspects and/or advantages of the invention will be set forth in part in the description which follows and, in part, will be apparent from the description, or may be learned by practice of the invention.

The foregoing and and/or other aspects of the present invention are achieved by providing a valve for an anti-lock brake system, the valve comprising: a valve core; an armature positioned below the valve core and provided at an end thereof with a ball; a cylindrical sleeve coupled with outer peripheral surfaces of the valve core and the armature to guide an up/down movement of the armature; a first elastic member installed between the valve core and the armature; a valve housing coupled to one end of the cylindrical sleeve and formed therein with a hollow section that extends lengthwise along the valve housing; a valve seat press-fitted into the hollow section and formed with a first orifice which is open/closed by the ball; and a filter seat press-fitted into the valve housing and provided with an inlet and an outlet, which are positioned at a circumferential portion and a lower portion of the filter seat, respectively.

The filter seat comprises a large-diameter section, into which a lower outer circumferential portion of the valve housing is press-fitted, and a small-diameter section press-fitted into an outlet fluid path of the valve seat.

A filter for filtering fluid is installed in the inlet.

The small-diameter section is provided at a lower portion thereof with a second orifice for adjusting a flow rate of fluid that flows out to the outlet.

An orifice bush having a second orifice, which adjusts a flow rate of fluid that flows out to the outlet, is press-fitted into an outlet fluid path and the outlet of the valve seat.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
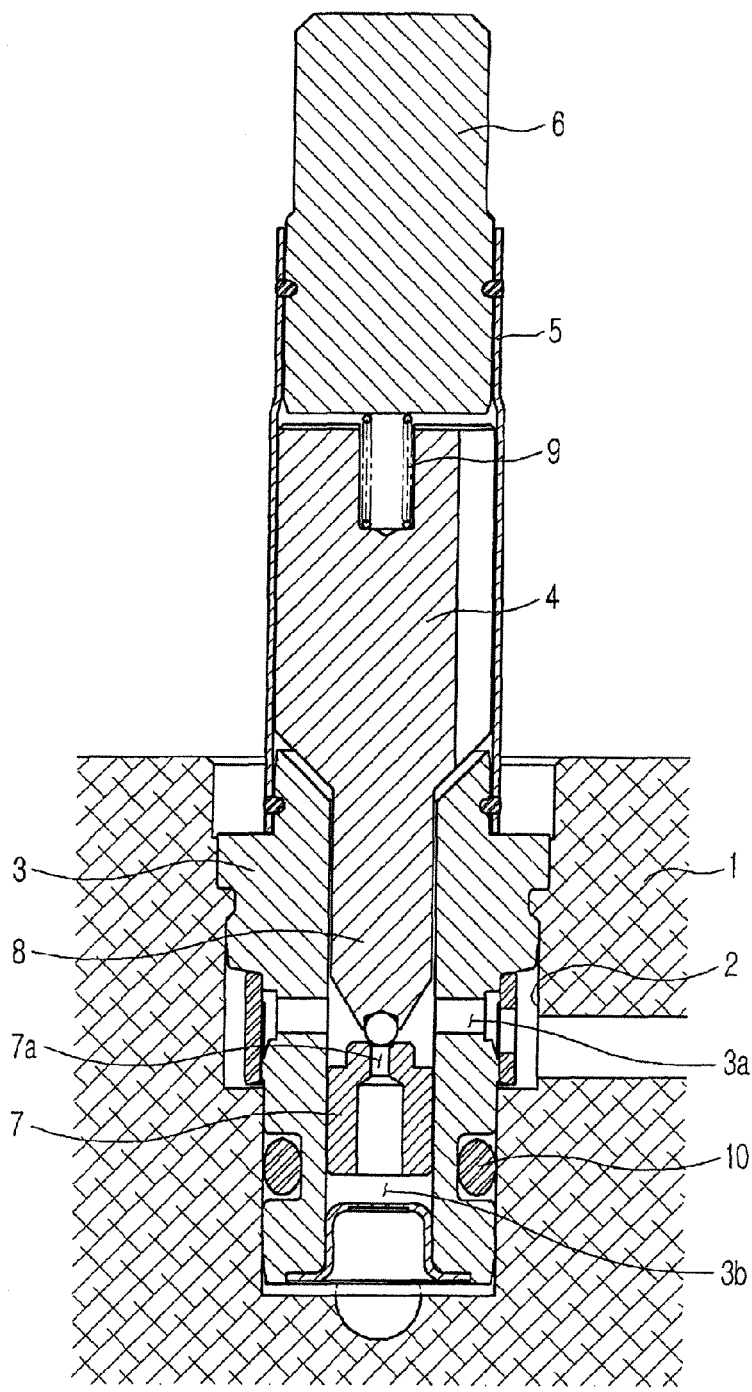
FIG. 1 is a sectional view showing a structure of a conventional solenoid valve.

Reference will now be made in detail to the embodiments of the present invention, examples of which are illustrated in the accompanying drawings, wherein like reference numerals refer to the like elements. The embodiments are described below to explain the present invention by referring to the figures.

Hereinafter, an exemplary embodiment of the present invention will be described in detail with reference to the accompanying drawings.

Figure 2:
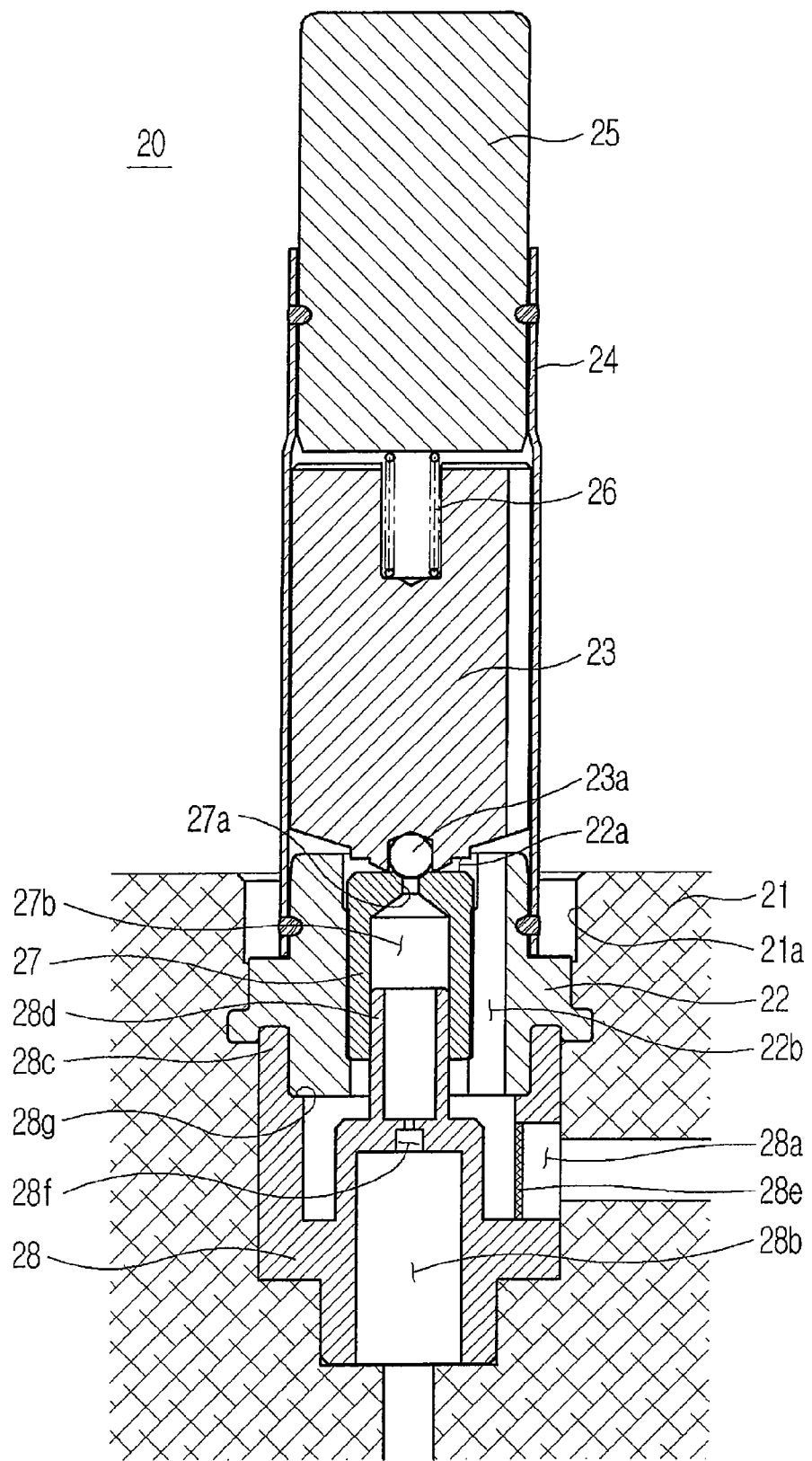
FIG. 2 is a sectional view showing a structure of a solenoid valve according to an embodiment of the present invention.

As shown in FIG. 2, a solenoid valve 20 for an anti-lock brake system according to the present invention comprises a valve housing 22 that is press-fitted into a bore 21a of a modulator block 21.

A cylindrical sleeve 24 is coupled to one end of the valve housing 22 such that an armature 23 installed in the valve housing 22 can move up and down through the cylindrical sleeve 24. A valve core 25 is coupled to an open end of the sleeve 24 to close the open part of the sleeve 24 and to allow the armature 23 to move up and down.

An elastic member 26 is installed between the valve core 25 and the armature 23 to apply elastic force to the armature 23 in the downward direction. A ball 23a is installed at a lower end of the armature 23.

A hollow section 22a is longitudinally formed in the valve housing 22 and a valve seat 27 is installed in the hollow section 22a. The valve seat 27 is press-fitted into the hollow section 22a to seal the hollow section 22a.

The valve seat 27 is formed with a first orifice 27a, which is open/closed by the ball 23a installed at the lower end of the armature 23 according to the up/down movement of the armature 23.

A filter seat 28 having an inlet 28a and an outlet 28b, which serve as an inlet and an outlet of the solenoid valve 20, is assembled with a lower portion of the valve housing 22.

The filter seat 28 has a substantially cylindrical shape and includes a large diameter section 28c into which the valve housing 22 is press-fitted, and a small diameter section 28d which is press-fitted into an outlet fluid path 27b formed below the first orifice 27a of the valve seat 27.

In addition, the inlet 28a is formed at one side of the filter seat 28 and a filter 28e is installed in the inlet 28a to filter fluid flowing through the inlet 28a.

As the small-diameter section 28d is press-fitted into the outlet fluid path 27b of the valve seat 27, the small-diameter section 28d is communicated with the first orifice 27a. In addition, a second orifice 27f is provided at a lower portion of the small-diameter section 28d to adjust the flow rate of fluid that flows out to the outlet 28b. A sectional area of the second orifice 28f may vary depending on the characteristics of the vehicle.

In addition, the outlet 28b that serves as an outlet of the solenoid valve is formed below the second orifice 28f and is communicated with a fluid path formed in the modulator block 21.

Meanwhile, as the large-diameter section 28c is press-fitted into the valve housing 22, the inlet 28a is formed between the filter seat 28 and the valve housing 22. In addition, a connection fluid path 22b is longitudinally formed in the valve housing 22 in order to guide fluid introduced into the inlet 28a toward a space formed between the armature 23 and the valve housing 22.

A step section 28g is formed at an inner circumferential portion of the large-diameter section 28c in order to enhance the sealing performance by increasing a contact area between the valve seat 28 and the valve housing 22 and to determine the insertion depth of the filter seat 28 relative to the valve housing 22.

Figure 3:
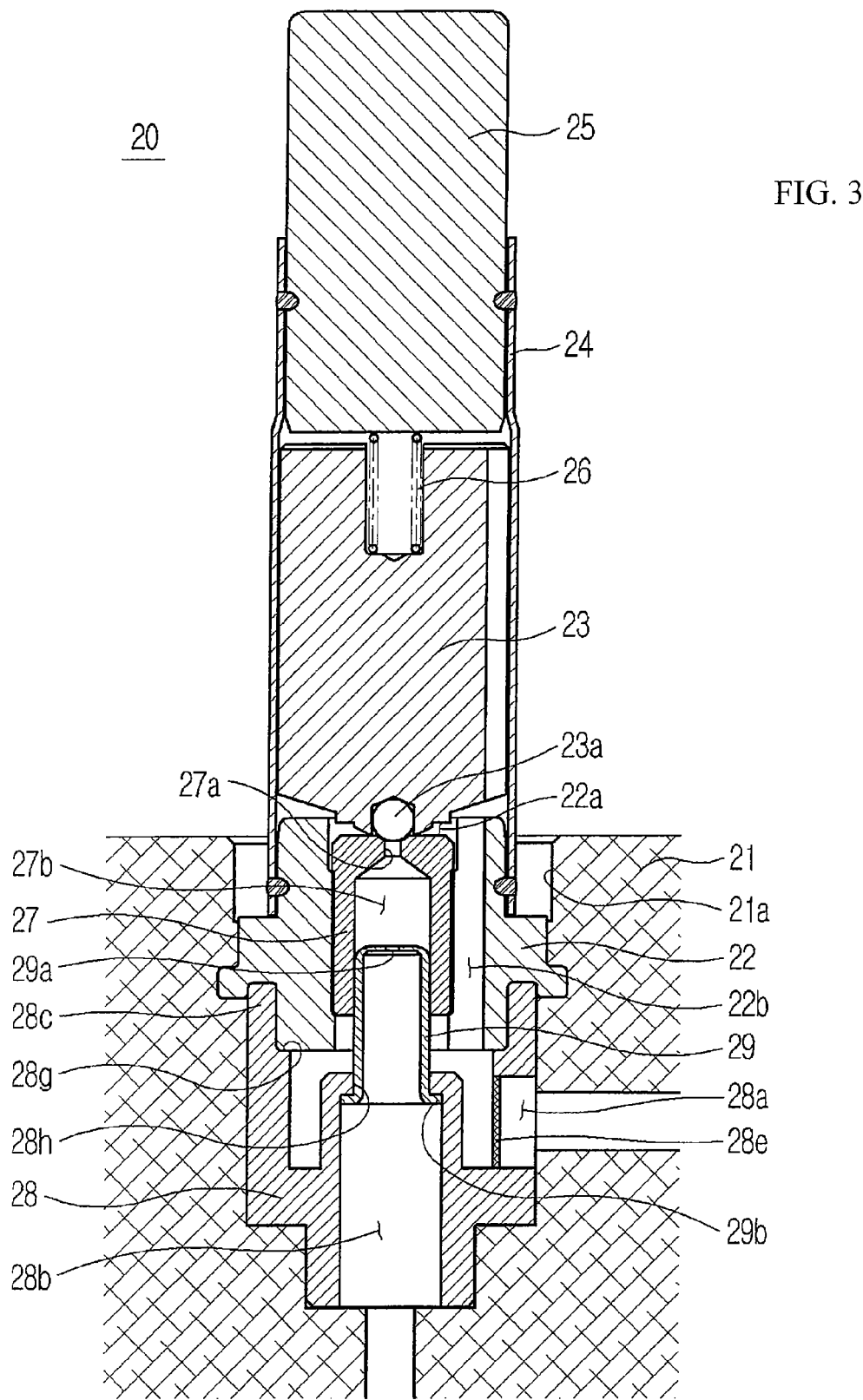
FIG. 3 is a sectional view showing a structure of a solenoid valve according to another embodiment of the present invention.

FIG. 3 shows a structure of a solenoid valve according to another embodiment of the present invention. The structure shown in FIG. 3 is basically identical to the structure of the previous embodiment except that an orifice bush 29 having a second orifice 29a is coupled with an outlet fluid path 27b of the valve seat 27.

The second orifice 29a is formed at an upper portion of the orifice bush 29 and a lower portion of the orifice bush 29 is connected to the outlet 28b of the filter seat 28.

The upper portion of the orifice bush 29 is press-fitted into the outlet fluid path 27b so that the sealing structure can be obtained relative to the valve seat 27. The lower portion of the orifice bush 29 is press-fitted into an installation hole 28h formed at the upper portion of the outlet 28b. As shown in FIG. 3, a flange section 29b can be formed at a lower end portion of the orifice bush 29 to facilitate installation work for the orifice bush 29.

As described above, if the second orifice 29a is prepared in the orifice bush 29, although the number of components is increased as compared with the case in which the second orifice is formed in the filter seat 28, it is possible to omit the processes for forming the small-diameter section and the second orifice. In addition, since the orifice bush can be easily fabricated through a plasticizing process, such as a drawing process, the manufacturing cost for the valve can be reduced.

According to the valve for the ant-lock brake system of the present invention, the valve housing supports the plunger such that the plunger can move up and down. In addition, the valve housing is press-fitted into the bore of the modulator block to improve the sealing performance in the valve paths. The valve paths, such as the inlet and the outlet provided in the modulator block, are defined by the filter seat that is press-fitted into the lower portion of the valve housing.

Therefore, it is possible to omit the process, such as the cutting process for forming the complicate configuration of the valve housing. In addition, the filter seat that forms the valve paths can be fabricated through the plasticizing process, such as the forging process, and the filter seat is press-fitted into the valve housing while sealing the internal fluid paths, so that assembling work for the valve can be simplified and the manufacturing cost thereof can be reduced.

In addition, since the sealing structure of the valve can be obtained by press-fitting the components of the valve with each other, an additional sealing member, such as an O-ring, and a structure for receiving the sealing member may not necessary, so that the valve has a compact structure.

Although few embodiments of the present invention have been shown and described, it would be appreciated by those skilled in the art that changes may be made in these embodi-

What is claimed is:

1. A valve for an anti-lock brake system, the valve comprising:
    a valve core;
    an armature positioned below the valve core and provided at an end thereof with a ball;
    a cylindrical sleeve coupled with outer peripheral surfaces of the valve core and the armature to guide an up/down movement of the armature;
    a first elastic member installed between the valve core and the armature;
    a valve housing coupled to one end of the cylindrical sleeve and formed therein with a hollow section that extends lengthwise along the valve housing, the valve housing having a groove circumferentially located on its bottom surface;
    a valve seat press-fitted into the hollow section and formed with a first orifice which is open/closed by the ball; and
    a filter seat press-fitted into the valve housing and provided with an inlet and an outlet, which are positioned at a circumferential portion and a lower portion of the filter seat, respectively,
    wherein the filter seat has a large-diameter section press-fitted into the groove of the valve housing and a small-diameter section press-fitted into an outlet fluid path of the valve seat,
    and the filter seat has a step section having a step shape cross-section view and disposed at an inner circumferential side surface of the large-diameter section such that the bottom surface of the valve housing is securely press-fitted to the step section.

2. The valve as claimed in claim 1, wherein a filter for filtering fluid is installed in the inlet.

3. The valve as claimed in claim 1, wherein the small-diameter section is provided at a lower portion thereof with a second orifice for adjusting a flow rate of fluid that flows out to the outlet.

4. The valve as claimed in claim 1, wherein an orifice bush having a second orifice, which adjusts a flow rate of fluid that flows out to the outlet, is press-fitted into an outlet fluid path and the outlet of the valve seat.

* * * * *